(12) United States Patent
Pan

(10) Patent No.: US 9,503,378 B2
(45) Date of Patent: Nov. 22, 2016

(54) LOAD-BALANCING ALGORITHMS FOR DATA CENTER NETWORKS

(71) Applicant: THE FLORIDA INTERNATIONAL UNIVERSITY BOARD OF TRUSTEES, Miami, FL (US)

(72) Inventor: Deng Pan, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 118 days.

(21) Appl. No.: 14/297,125

(22) Filed: Jun. 5, 2014

(65) Prior Publication Data

US 2014/0362705 A1 Dec. 11, 2014

Related U.S. Application Data

(60) Provisional application No. 61/832,458, filed on Jun. 7, 2013.

(51) Int. Cl.
| | |
|---|---|
| H04L 12/26 | (2006.01) |
| H04L 12/803 | (2013.01) |
| H04L 12/851 | (2013.01) |
| H04L 12/729 | (2013.01) |
| H04L 12/701 | (2013.01) |
| H04L 12/801 | (2013.01) |

(52) U.S. Cl.
CPC ............. H04L 47/125 (2013.01); H04L 45/00 (2013.01); H04L 45/125 (2013.01); H04L 47/11 (2013.01); H04L 47/2441 (2013.01)

(58) Field of Classification Search
CPC ..................... H04L 12/24; H04L 12/26; H04L 12/28; H04L 12/56; H04L 47/125; H04L 47/2441; H04L 45/00; H04L 45/125; H04L 47/11; H04L 47/18

USPC .................. 370/230, 232, 236, 237, 392
See application file for complete search history.

(56) References Cited

U.S. PATENT DOCUMENTS

| | | | | |
|---|---|---|---|---|
| 9,036,481 B1 * | 5/2015 | White | ............... | H04L 47/11 370/235 |
| 2002/0176363 A1 * | 11/2002 | Durinovic-Johri | ..... | H04L 45/00 370/237 |
| 2008/0144511 A1 * | 6/2008 | Marcondes | ............. | H04L 45/00 370/236 |
| 2009/0080328 A1 * | 3/2009 | Hu | ..................... | H04L 65/4084 370/230 |
| 2009/0274044 A1 * | 11/2009 | Goose | ................... | H04L 12/413 370/225 |

(Continued)

OTHER PUBLICATIONS

"Cisco Plug-in for OpenFlow Configuration Guide 1.1.5," *Cisco Systems, Inc.*, Sep. 4, 2014, p. 1-68.

(Continued)

*Primary Examiner* — Anh Ngoc Nguyen
*Assistant Examiner* — Harun Chowdhury
(74) *Attorney, Agent, or Firm* — Saliwanchik, Lloyd & Eisenschenk

(57) ABSTRACT

Multipath load-balancing algorithms, which can be used for data center networks (DCNs), are provided. A multipath load-balancing algorithm can be, for example, a distributed multipath load-balancing algorithm or a centralized multipath load-balancing algorithm. Algorithms of the subject invention can be used for, e.g., hierarchical DCNs and/or fat-tree DCNs. Algorithms of the subject invention are effective and scalable and significantly outperform existing solutions.

12 Claims, 5 Drawing Sheets

(56) References Cited

U.S. PATENT DOCUMENTS

2010/0020806 A1* 1/2010 Vahdat .................. H04L 45/00
370/395.31

OTHER PUBLICATIONS

"NEC Programmable Flow: Redefining Cloud Network Virtualization with OpenFlow," *NEC Corporation of America*, 2011, p. 1-10.
"OpenFlow Switch Specification: Version 1.0.0 (Wire Protocol 0x01)," *Open Networking Foundation*, Dec. 31, 2009, p. 1-44.
Cormen, T.H. et al., "Depth-first search," from *Introduction to Algorithms*, MIT Press, 3$^{rd}$ ed., 2009, p. 603.
Garey, Michael R. et al., "Computers and Intractability: A Guide to the Theory of NP Completeness," *Bell Laboratories*, Murray Hill, New Jersey, 1979, p. 60-61.
Kurose, J. et al., "Computer networking: a top-down approach," *Virtual Circuit and Datagram Networks*, 4th ed., 2007, p. 317.
Pan, Deng. "Localized Independent Packet Scheduling for Buffered Crossbar Switches," *IEEE Transactions on Computers*, 2009, 58(2):1-15.
Al-Fares, Mohammad et al., "A Scalable, Commodity Data Center Network Architecture," *ACM SIGCOMM*, Aug. 2008, p. 63-74.
Al-Fares, Mohammad et al., "Hedera: Dynamic Flow Scheduling for Data Center Networks," *USENIX NSDI*, Apr. 2010, p. 1-15.
Benson, Theophilus et al., "The Case for Fine-Grained Traffic Engineering in Data Centers," *USENIX INM/WREN*, Apr. 2010, p. 1-6.
Chen, Kai et al., "Generic and Automatic Address Configuration for Data Center Networks," *ACM SIGCOMM*, Aug. 2010, p. 1-12.
Chen, Kai et al., "Survey on Routing in Data Centers: Insights and Future Directions," *Tech. Rep.*, Jul./Aug. 2011, p. 2-6.
Fraleigh, Chuck et al., "Packet-Level Traffic Measurements from the Sprint IP Backbone," *IEEE Network*, Nov. 2003, 17(6):6-16.
"GENI OpenFlow Backbone Development at Internet2," accessed from http://groups.geni.net/geni/wiki/OFI2.
Greenberg, Albert et al., "VL2: A Scalable and Flexible Data Center Network," *ACM SIGCOMM*, Aug. 2009, p. 1-12.
Guo, Chuanxiong et al., "BCube: A High Performance, Server-centric Network Architecture for Modular Data Centers," *ACM SIGCOMM*, Aug. 2009, p. 1-12.
Guo, Chuanxiong et al., "DCell: A Scalable and Fault-Tolerant Network Structure for Data Centers," *ACM SIGCOMM*, Aug. 2008, p. 75-86.
Heller, Brandon et al., "ElasticTree: Saving Energy in Data Center Networks," *USENIX NSDI*, Apr. 2010, p. 1-16.
"HP OpenFlow Switches," accessed from http://h30507.www3.hp.com/t5/HP-Networking/Take-control-of-the-network-OpenFlow-a-new-tool-for-building-and/ba-p/92201.
"IP Multicast Load Splitting—Equal Cost Multipath (ECMP) Using S, G and Next Hop," accessed from http://www.cisco._com/en/US/docs/ios/12_2sr/12_2srb/feature/quide/srbmpath.htmlg.
Johnson, David S. "Fast Algorithms for Bin Packing," *Journal of Computer and System Sciences*, 1974, 8(3):272-314.
McKeown, Nick et al., "OpenFlow: Enabling Innovation in Campus Networks," *ACM SIGCOMM Computer Communication Review*, Apr. 2008, 38(2):69-74.
Miller, Rich. "Who Has the Most Web Servers?" *Data Center Knowledge*, 2009, accessed from http://www.datacenterknowledge.com/archives/2009/10/13/facebook-now-has-30000-servers/.
Mudigonda, Jayaram, "SPAIN: COTS Data-Center Ethernet for Multipathing over Arbitrary Topologies," *USENIX NSDI*, Apr. 2010, p. 1-16.
Mysore, Radhika Niranjan et al., "PortLand: A Scalable Fault-Tolerant Layer 2 Data Center Network Fabric," *ACM SIGCOMM*, Aug. 2009, p. 1-12.
Naous, Jad et al., "Implementing an OpenFlow Switch on the NETFPGA platform," *ACM/IEEE ANCS*, Nov. 2008, p. 1-9.
"OpenFlow Slicing," accessed from http://www.openflowswitch.org/wk/index.php/Slicing.
Pan, Deng et al., "Localized independent packet scheduling for buffered crossbar switches," *IEEE Transactions on Computers*, Feb. 2009, 58(2):260-274.
"The OpenFlow Switch Consortium," accessed from http://www.openflowswitch.org.
Wang, Guohui et al., "c-Through: Part-time Optics in Data Centers," *ACM SIGCOMM*, Aug. 2010, p. 327-338.

* cited by examiner

LOAD-BALANCING ALGORITHMS FOR DATA CENTER NETWORKS

CROSS REFERENCE TO RELATED APPLICATION

The present application claims the benefit of U.S. Provisional Application Ser. No. 61/832,458, filed Jun. 7, 2013, which is hereby incorporated by reference herein in its entirety, including any figures, tables, and drawings.

BACKGROUND OF INVENTION

Data centers contain large numbers of servers to achieve economies of scale [19], and the number is increasing exponentially [13]. For example, it is estimated that Microsoft's Chicago data center has about 300,000 servers [1]. The huge number of servers has created a challenge for the data center network (DCN) to offer proportionally large bandwidth to interconnect the servers [30]. As a result, modern DCNs usually adopt multi-rooted hierarchical topologies, such as the fat tree [2], VL2 [11], DCell [13], and BCube [12], which offer multipath capability for large bisection bandwidth and increased bandwidth and fault tolerance. For example, FIG. 1 shows a diagram of a hierarchical fat tree topology. The topology in FIG. 1 has four layers: hosts; edge switches; aggregation switches; and core switches, from the bottom to top, and the four core switches act as the multiple roots of the network. As a result, there are two different paths between hosts A and B, as shown in different colors (green and red).

However, traditional link state and distance vector based [16] routing algorithms (e.g., for the internet) cannot readily utilize the multipath capability of multi-rooted topologies. Traditional routing algorithms calculate routes based on only packet destinations, and thus all packets to the same destination share the same route. Although equal cost multipath (ECMP) [9] supports multipath routing, it performs static load-splitting based on packet headers without accounting for bandwidth, allows only paths of the same minimum cost, and supports an insufficiently small number of paths [14]. Further, traditional routing algorithms usually give preference to the shortest path to reduce the propagation delay. Due to small geographical distances, DCNs are less concerned about the propagation delay, but give priority to bandwidth utilization.

Typical DCNs offer multiple routing paths for increased bandwidth and fault tolerance. Multipath routing can reduce congestion by taking advantage of the path diversity in DCNs. Typical layer-two forwarding uses a spanning tree, where there is only one path between source and destination nodes. A recent work provides multipath forwarding by computing a set of paths that exploits the redundancy in a given network, and merges these paths into a set of trees, each mapped as a separate VLAN [19]. At layer three, equal cost multipath (ECMP) [9] provides multipath forwarding by performing static load splitting among flows. ECMP-enabled switches are configured with several possible forwarding paths for a given subnet. When a packet arrives at a switch with multiple candidate paths, the switch forwards it on to the one that corresponds to a hash of selected fields of the packet header, thus splitting the load to each subnet across multiple paths. However, ECMP does not account for flow bandwidth in making allocation decisions, which may lead to oversubscription even for simple communication patterns. Further, current ECMP implementations limit the multiplicity of paths to 8-16, which is fewer than what would be required to deliver high bisection bandwidth for larger data centers [14].

There exist multipath solutions for DCNs, including Global First-Fit and Simulated Annealing [4]. The former simply selects among all the possible paths that can accommodate a flow, but needs to maintain all paths between a pair of nodes. The latter performs a probabilistic search of the optimal path, but converges slowly. The ElasticTree DCN power manager uses two multipath algorithms, Greedy Bin-Packing and Topology-Aware Heuristic [14]. The former evaluates possible paths and chooses the leftmost one with sufficient capacity. The latter is a fast heuristic based on the topological feature of fat trees, but with the impractical assumption to split a flow among multiple paths. The MicroTE framework supports multipath routing, coordinated scheduling of traffic, and short term traffic predictability [5].

BRIEF SUMMARY

Embodiments of the subject invention provide multipath load-balancing algorithms, which can be used for data center networks (DCNs). In several embodiments, a multipath load-balancing algorithm is a distributed multipath load-balancing algorithm. In several embodiments, a multipath load-balancing algorithm is a centralized multipath load-balancing algorithm. Algorithms of the subject invention can be used for, e.g., hierarchical DCNs and/or fat-tree DCNs. Algorithms of the subject invention advantageously significantly outperform existing solutions. In addition, the designs of algorithms of the subject invention are effective and scalable.

In an embodiment, a method of load balancing in a network can include: receiving, by a switch, a packet; looking up, by the switch, a packet header of the packet to check whether the packet belongs to an existing flow; if the packet belongs to an existing flow, forwarding the packet based on information in a flow table of the switch, and otherwise, creating a new entry in the flow table for the packet and calculating the next hop; determining if the next hop is an upstream or downstream layer of the network based on a destination IP address; and comparing load values of links to the next layer and selecting a worst-fit link. Such a method can be an example of a distributed multipath load-balancing algorithm.

In another embodiment, a method of load balancing in a network can include: checking which layer of the network a packet should go through based on locations of a source host of the network and a destination host of the network; determining, by a central controller, a bottleneck link of each potential path corresponding to a different connecting layer switch; comparing, by the controller, the available bandwidth of all the potential paths and finding the path with the maximum bandwidth; if the maximum bandwidth is greater than a demand of a flow of the network, then selecting the corresponding path for the flow, and otherwise, determining that no viable path exists for the packet. Such a method can be an example of a centralized multipath load-balancing algorithm.

DETAILED DISCLOSURE

Figure 1:
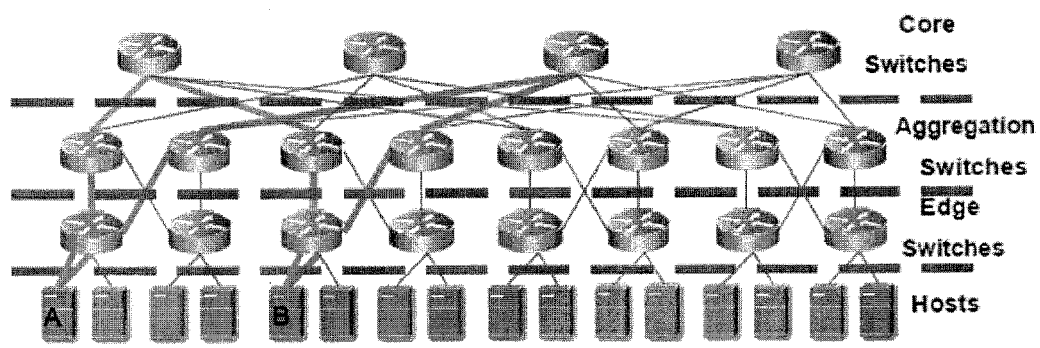
FIG. 1 shows a diagram of a hierarchal fat tree topology.

Embodiments of the subject invention provide multipath load-balancing algorithms, which can be used for data center networks (DCNs). In several embodiments, a multipath load-balancing algorithm is a distributed multipath load-balancing algorithm. In several embodiments, a multipath load-balancing algorithm is a centralized multipath load-balancing algorithm. Algorithms of the subject invention can be used for, e.g., hierarchical DCNs and/or fat-tree DCNs. Algorithms of the subject invention advantageously significantly outperform existing solutions, such as benchmark algorithms. In addition, the designs of algorithms of the subject invention are effective and scalable.

Embodiments of the subject invention provide load-balancing algorithms that enable full bandwidth utilization and efficiency packet scheduling. In several embodiments, an algorithm is a centralized multipath load-balancing algorithm. The route can be determined by selecting the top-layer switch with the minimum bottleneck link load. In an embodiment, the first step is to determine the top-layer layer to connect the source and destination hosts. Hosts in a fat-tree network typically have internet protocol (IP) addresses corresponding to their topological locations. Determining the top-layer avoids wasting bandwidth of switches at higher layers, which will be available for future flows. The second step is then to compare the bottleneck link load of the candidate paths via different top-layers switches. The design is based on the observation that there is only a single path from a top-layer switch to any host. Therefore, for a specific top-layer switch, the path from the source to the destination can be determined. By selecting the minimum bottleneck load, the algorithm achieves the load-balancing objective.

In an embodiment, the algorithm can be implemented in a fat-tree network leveraging flow protocols such as Open-Flow, and supports efficient routing in commercial data centers. Centralized multipath load-balancing algorithms of the subject invention help achieve high network throughput and short packet delay.

In several embodiments, an algorithm is a distributed multipath load-balancing algorithm Depth-first search can be used to find a sequence of worst-fit links to connect the source and destination of a flow. Because DCN topologies are typically hierarchical, the depth-first search can quickly traverse between the hierarchical layers of switches to find a path. When there are multiple links to the neighboring layer, the worst-fit criterion always selects the one with the largest amount of remaining bandwidth. By using the max-heap data structure, worst-fit can make the selection decision with constant time complexity. Further, worst-fit achieves load balancing, and therefore avoids unnecessary backtracking in the depth-first search and reduces packet queuing delay. The distributed nature of the algorithm can guarantee scalability.

In an embodiment, the algorithm can be conventially implemented in switches and routers, and supports efficient routing in commercial data centers. Distributed multipath load-balancing algorithms of the subject invention help achieve high network throughput and short packet delay.

Embodiments of the subject invention can be applied for routing in modern DCNs to improve network throughput and reduce packet latency. Multipath routing is supported by allowing different flows to the same destination to take different routes, which is not possible with existing routing algorithms. The multipath capability of modern DCNs can be fully utilized, while achieving excellent (e.g., perfect) load balancing with only local information. Algorithms of the subject invention fully utilize the hierarchical characteristic of multi-rooted data center networks (including fat-tree networks), and are efficient with low time complexity.

To fully explore bandwidth, DCNs with multi-rooted topologies need practical and efficient multipath routing algorithms, which should satisfy one or more (ideally all) of the following design objectives. First, the algorithm should maximize bandwidth utilization (i.e., achieve a high routing success ratio), so that the same network hardware can accommodate as much traffic as possible. Second, the algorithm should achieve load balancing to inhibit the network from generating hot spots, and therefore avoid long queuing delays for the packets. Third, in order for the algorithm to be scalable and handle the large volume of traffic in DCNs, it must have low time complexity and make fast routing decisions.

In an embodiment, a depth-first worst-fit search-based algorithm can be used for traditional distributed networks. Depth-first search can be used to find a sequence of worst-fit links to connect the source and destination of a flow. Because DCN topologies are typically hierarchical, the depth-first search can quickly traverse between the hierarchical layers of switches to find a path. When there are multiple links to the neighboring layer, the worst-fit criterion selects the one with the most available bandwidth, and thus balances the traffic load among the links. By using the max-heap data structure, worst-fit can make the selection decision with constant time complexity. Also, worst-fit achieves load balancing, and therefore avoids unnecessary backtracking in the depth-first search and reduces packet queuing delay.

In an embodiment, a centralized algorithm can be used for flow networks, such as OpenFlow [17], by leveraging the centralized control framework. The central controller can be used to collect information from the entire network and make optimal routing decisions based on such information. The algorithm can first determine all the potential paths for a flow and find the bottleneck link of each path, which is the link with the minimum available bandwidth. The algorithm can then compare all the bottleneck links and select the path whose bottleneck link has the most available bandwidth. In this way, the algorithm can guarantee that the selected path minimizes the maximum link load of the entire network at the decision time, and therefore achieves load balancing.

In several embodiments, a multipath routing algorithm uses depth-first search to quickly find a path between hierarchical layers, and uses worst-fit to select links with low time-complexity and avoid creating hot spots in the network. This is superior to the existing solutions discussed in the Background section.

In an embodiment, a DCN is modeled as a directed graph $G=(H \cup S, L)$, in which a node $h \in H$ is a host, a node $s \in S$ is a switch, and an edge $(n_i, n_j) \in L$ is a link connecting a switch with another switch or a host. Each edge $(n_i, n_j)$ has a nonnegative capacity $c(n_i, n_j) \geq 0$ indicating the available bandwidth of the corresponding link. There are n flows $F_1, \ldots, F_n$ in the DCN. $F_k$ is defined as a triple $F_k=(a_k, b_k, d_k)$, where $a_k \in H$ is the source host, $b_k \in H$ is the destination host, and $d_k$ is the demanded bandwidth. Use $f_k(n_i,n_j)$ to indicate whether flow $K_k$ is routed via link $(n_i,n_j)$.

The load-balancing objective function minimizes the maximum load among all the links, i.e.

Minimize Maxload subject to the following constraints:

$$\forall (n_i, n_j) \in L, \sum_k f_k(n_i, n_j) d_k \le c(n_i, n_j) \text{maxload} \le c(n_i, n_j) \quad (1)$$

$$\forall k, \forall n_i \in H \cup S \setminus \{a_k, b_k\}, \sum_{n_j \in H \cup S} f_k(n_i, n_j) = \sum_{n_j \in H \cup S} f_k(n_j, n_i) \quad (2)$$

$$\forall k, \sum_{n_i \in H \cup S} f_k(a_k, n_i) = \sum_{n_i \in H \cup S} f_k(n_i, b_k) = 1 \quad (3)$$

Equation (1) defines maxload, and states the link capacity constraint (i.e., the total demanded bandwidth on a link not exceeding its available bandwidth). Equation (2) states the flow conservation constraint (i.e., the amount of any flow not changing at intermediate nodes). Equation (3) states the demand satisfaction constraint (i.e., for any flow, the outgoing traffic at the source or the incoming traffic at the destination equal to the demand of the flow).

The load-balanced multipath routing problem can be proven to be NP-complete by reduction of the integer partition problem. The following theorem shows the NP-hardness of the studied problem.

Theorem 1: The load-balanced multipath routing problem is NP-hard for the fat tree topology.

Proof: The theorem is proven by reduction from the integer partition problem [18]. An integer partition problem decides whether a set of integers $A=\{a_i, \ldots, a_n\}$ can be partitioned into two subsets P and A|P such that the sum of elements in P is equal to that in A|P, i.e., $$\exists P \subseteq A, \sum_{a_i \in P} a_i = \sum_{a_i \in A \setminus P} a_i \quad (4)$$

Figure 2:
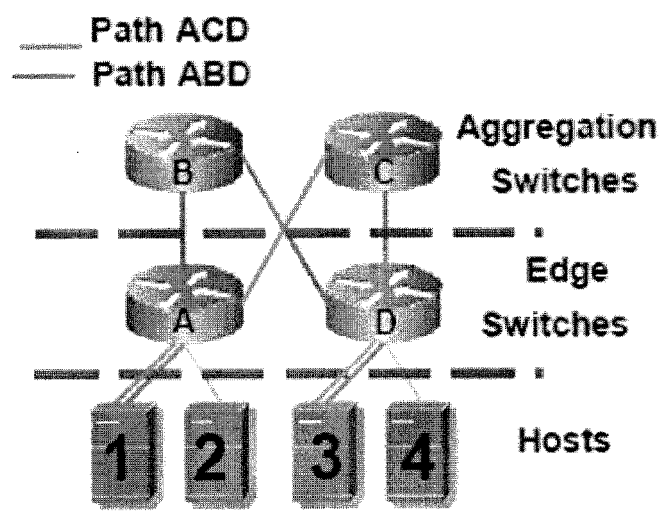
FIG. 2 shows a diagram of a single pod from a 4-pod fat tree topology.

To reduce the load-balanced problem from the above integer partition problem, consider an instance of a partition problem with set A, and an instance of the load-balanced multipath routing problem can be constructed under the fat-tree topology as follows. First, a 4-pod fat tree network can be set up, in which each link has infinite link. The detail of one pod is shown in FIG. 2. The infinite link bandwidth satisfies the first constraint of the load balancing problem. Next, two hosts are considered, of different edge switches but situated in the same pod, as labeled by 1 and 3 in FIG. 2. The former is the source while the latter is the destination. This means that the flows can only choose from two paths, path ACD and path ABD, as shown in FIG. 2, in order to reach the destination. There are n flows from the source to the destination, and their demands are represented by each element in set A, which is the instance of the partition problem.

Assume that a successful partition is present in set A, as shown in Equation 4. This implies that two equal subsets of set A are present and each subset of flow demands is assigned to one of the paths, and assures minimization of maximum load among them, reducing the maximum load to half. If successful partition is not achieved, unequal subsets would result in one of the paths having under-loaded links while the other path will be facing congestion. This also satisfies the remaining two constraints of the load balancing problem.

In the other direction, consider that a perfectly load-balanced network is present in FIG. 2, i.e., the current load in the network is equal to half of the maximum load. Also, the flows passing through path ABD have the same total demand as the flows passing through path ACD. Accordingly, for the integer partition problem, a subset $A_s$ can be found, whose elements are corresponding to the flows traversing path ABD. Thus, $A_s$ and $A|A_s$ have the same sum. Hence the load balancing problem is NP hard for typical fat tree topology.

Theorem 2: Proof: The load-balanced multipath routing problem is NP-hard for the VL2 topology.

Proof: The proof is similar to the one discussed above. It is due to the fact that in case of a VL2 network, the connections between edge and aggregation switches are in similar fashion as in a 4-pod fat tree network, as seen in FIG. 2.

In several embodiments of the subject invention, an algorithm uses depth-first search. Depth-first search utilizes the hierarchical feature of DCN topologies to quickly find a path connecting the hierarchical layers. DCNs are typically organized in a hierarchical structure with multiple layers of switches and one layer of hosts [11]-[13]. For example, a fat tree [20] DCN has one layer of hosts, edge switches, aggregation switches, and core switches, respectively, as shown in FIG. 1. Since a path typically has links connecting hosts and switches at different layers, depth-first search can quickly traverse these layers. For example, a path connecting two servers of the same edge switch in a fat tree will traverse from the host layer to the edge switch layer and then back to the host layer, as shown in FIG. 1. If the search has exhausted all the links in a layer and cannot proceed further, it is necessary to backtrack to the previous layer [8] and try the next candidate.

In several embodiments of the subject invention, an algorithm uses worst-fit. When there are multiple links to the neighboring layer, the worst-fit criterion can select the one with the most available bandwidth. On the other hand, the first-fit criterion ([4], [14]) selects the first (or leftmost) link with sufficient available bandwidth, and best-fit selects the link with the least but sufficient available bandwidth.

Compared with first-fit or best-fit, worst-fit has the following advantages. First, worst-fit has time complexity of $O(1)$ by trying only the link with the largest bandwidth. Since the controller needs to search a path on the fly for each flow, constant time complexity helps accelerate the routing process. In contrast, first-fit has time complexity $O(\log N)$ to select from N candidates, where N grows with the DCN size, using the special winner tree data structure [15]. Similarly, best-fit has time complexity of $O(\log N)$ by conducting binary search on a pre-sorted list. Second, worst-fit achieves load balancing by evenly distributing traffic among all links, and therefore it needs fewer link selections on the average to find a path. This characteristic also helps worst-fit find a path faster than first-fit and best-fit by avoiding excessive backtracking. As a comparison, first-fit and best-fit tend to consolidate traffic to certain links and eventually block them. If all the neighboring links of a switch are blocked, the path searching has to backtrack to the previous layer, and thus needs more link selection decisions. Third, because worst-fit achieves load balancing, it is less likely to create hot spots in the network, avoiding long packet queuing delay. On the other hand, first-fit and best-fit keep increasing the load of a link until it is saturated. In this case, heavily loaded links suffer from extra latency, while some other links are still idle.

In several embodiments, an algorithm is a distributed algorithm. Because the algorithm runs in a distributed manner, each switch works independently. When a switch receives a new packet, the switch first checks whether the packet belongs to an existing flow by looking up the packet header. If yes, there is already an entry in the flow table for the existing flow, and the switch will forward the packet based on the information in the flow table. Otherwise, if the packet is the first one of a new flow, the switch will create a new entry for the flow in its flow table, and calculate the next hop. Then, the switch can determine whether the next hop should be an upstream or downstream layer. Hosts in DCNs typically have IP addresses corresponding to their topological locations [6]. Therefore, based on the destination IP address, the switch can find by which layer the source and destination hosts can be connected. For example, in a fat tree based DCN, hosts in the same pod typically share the same subnet address [20], and a flow between hosts in different pods has to go through a core switch. Thus, the flow will first go upstream until it reaches a core switch, and then heads back downstream until it arrives at the destination. Next, if there are multiple links to the next layer, the switch compares the load values of the links and selects the worst-fit one. In the case that there is no viable link to the next layer, the switch will send the packet back to the previous hop for backtracking.

In order to take optimal routing decisions for each flow and to achieve distributed control over the network, each switch can maintain a flow table. An entry in the flow table maintained at each switch in the network can include the source address, source port number, the destination address, destination port number, and the outgoing link on which the flow is assigned [17]. A separate entry is made for each flow that arrives at a particular switch. Whenever a new flow arrives at a switch, the switch can create an entry in the flow table for the new flow. After a link is selected for the flow, it is added to the entry as an outgoing link for that particular flow.

The flow table in the switch can help determine whether the packet should be treated as the packet of a new flow, an existing flow, or backtracked. If the received packet is from a new flow, no entry would be present in the flow table, and the algorithm will start searching for a link for this flow. If the packet is from an existing flow, the switch will already have an entry and will send the packet to its outgoing link after looking at the entry in its flow table. A packet would be treated as a backtracked packet if it is received from its outgoing link, i.e., the link on which this packet was previously assigned, as the switch will already have an entry for that packet. From the discussion in this and the previous paragraph, an algorithm of the subject invention plainly fulfills design objectives discussed above. First, with the help of link availability searching and backtracking, it can find a path if one exists. Second, with the help of link load probabilities, it guarantees a load balanced network.

In several embodiments, an algorithm is a centralized load-balanced multipath routing algorithm. It can be implemented on, e.g, the OpenFlow protocol. A centralized controller can be used to collect load information of all the links in the network, and make a globally optimal decision. When a new flow comes, the controller can enumerate all the possible paths, compare the loads of the bottleneck links of them, and select the one with the minimum load.

To optimize bandwidth utilization in DCNs, it is important to have a global view of the available resources and requests in the network [5]. A central controller can be utilized for this purpose and can communicate with switches in the DCN (e.g., by the OpenFlow protocol) [27]. Each OpenFlow enabled switch has a flow table to control flows, where a flow can be flexibly defined by any combination of the ten packet headers at arbitrary granularity [17]. The controller can control the flows by querying, inserting, or modifying entries in the flow tables. In this way, the central controller can collect bandwidth and flow information of the entire network from the switches, make optimal routing decisions, and send the results back to the switches to enforce the planning routing. Multiple choices of OpenFlow devices are already available on the market [21], [22], [24]-[26], and OpenFlow has been adopted in many recent data center designs [4], [5], [14], [20]. The availability of OpenFlow switches makes it practical to quickly experiment with and deploy algorithms of the subject invention.

In an embodiment of a centralized load-balanced multipath routing algorithm, in the first step, the algorithm checks which layer the path needs to go through based on the locations of the source and destination hosts. If they are in different pods, then the path needs to go through a core switch. If they are attached to the same edge switch, then the edge switch will connect them. Otherwise, if they are in the same pod but not under the same edge switch, an aggregation switch is necessary to connect them. In the second step, the central controller determines the bottleneck link of each potential path corresponding to a different connecting layer switch. Note that in a fat tree network, once the connecting layer is determined, the path from the source to the destination is determined as well. The central controller has the information of every link in the network, and this can be done quickly by comparing the loads of all the links on the path. The link with the smallest available bandwidth is called the bottleneck link of this path. In the third step, the controller compares the available bandwidth of all the potential paths and finds the one with the maximum. If the maximum bandwidth is greater than the demand of the flow, then the corresponding path is selected for the flow. The controller can then set up the flow tables of all the switches on the path accordingly. Otherwise, if the maximum bottleneck link bandwidth is less than the flow demand, there does not exist a viable path for this flow.

As discussed above, the centralized algorithm can run in the OpenFlow controller that has a global view of the entire network. After the algorithm successfully finds a path, it will deduct the flow demand from the available bandwidth of the links in the path and update the heaps. Fortunately, paths in DCNs typically have a small number of hops, so that the process can finish quickly. From the discussion in this and the previous few paragraphs, a centralized algorithm of the subject invention plainly fulfills design objectives discussed above. First, it achieves high bandwidth utilization by exhaustive search, and can guarantee to find a path if one exists. Second, excellent (e.g., perfect) load-balancing can be achieved or even guaranteed by selecting the path whose bottleneck link has the most available bandwidth. Third, the logarithmic comparison operation can achieve or even guarantee low time complexity and fast routing decisions.

DCNs often rely on multipath capability for increased bandwidth and fault tolerance. Embodiments of the subject invention provide load-balanced multipath routing algorithms to fully efficiently utilize available bandwidth in DCNs. The problem can be forumlated as a linear program and shown that it is NP-complete for typical DCN topologies by reduction from the integer partitioning problem. The NP-completeness proof shows that the problem has no efficient polynomial-time solutions, and therefore no approximation solutions may be possible. In various embodiments, a distributed algorithm can be used for traditional networks, and a centralized algorithm can be used for flow networks. A distributed algorithm can use depth-first search to quickly traverse between the hierarchical layers, and can adopt the worst-fit link selection criterion to achieve load balancing and low time complexity. The centralized algorithm can rely on a centralized control framework of the OpenFlow protocol and can collect complete information of the network and make optimal load balancing decisions.

Large scale simulations of the algorithms of the subject invention, using the NS-3 simulator demonstrate the effectiveness and scalability of the designs of the algorithms of the subject invention. This is true for both distributed and centralized algorithms of the subject invention.

In several embodiments, algorithms (both distributed and centralized) advantageously rely on network devices and can be transparent to hosts. Algorithms of the subject invention have at least the following advantages. First, data center customers can run their software on commodity operating systems without compromising security or compatibility. Second, users can enjoy the benefits of load-balanced multipath routing even if their operating systems are not open-source and consequently not customizable. Third, algorithms of the subject invention have lower maintenance costs because operating systems and hosts upgrade more frequently than network devices do.

The methods and processes described herein can be embodied as code and/or data. The software code and data described herein can be stored on one or more computer readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals.

EXAMPLES

Following are examples that illustrate procedures for practicing the invention. These examples should not be construed as limiting.

Example 1

Experimental performance results were obtained from a real testbed, implemented using the Beacon OpenFlow controller, HP ProCurve OpenFlow switches, VMware vCenter server, and VMware ESXi hypervisor.

A 4-pod and 16-host fat-tree prototype was built to demonstrate the effectiveness and practicality of the optimization algorithm in real networks. Two OpenFlow-enabled 48-port HP ProCurve 6600 switches running firmware version K.15.06.5008 were utilized, and 20 virtual switches were created. Each virtual switch was assigned with 4 ports, except the first core layer switch had 3 extra ports to allow connections for management nodes, including VMware vCenter server, Network File System (NFS) server, and DHCP server. All switches were managed by Beacon OpenFlow controller version 1.0.0 with a self-developed Equinox framework bundle that implemented the optimization algorithm. Each host was running VMware ESXi hypervisor version 5.0.0 to host VMs running operating system of Ubuntu Server 12.04.1 LTS 64 bit. The hosts and VMs were configured to request IP address upon startup through DHCP protocol. When the controller detected the DHCP discovery message sent by a host or a VM, it recorded the host's or the VM's MAC address and location based on which input port of which ToR switch received the message. The IP address of the host or VM was updated when the controller detected the DHCP offer message. All hosts and VMs were remotely managed by VMware vCenter server version 5.0.0. Each VM's file system is provided by a NFS server implemented on a Linux PC running Ubuntu version 12.04.

Iperf UDP flows were employed to emulate the production traffic in data centers. The controller assigned initial routing paths to the flows. The initial routing paths were calculated by using Shortest Path Routing algorithm. If multiple routing paths from the source to the destination exist, the controller selects one of them randomly. For each switch on the routing path, the controller also calculates each flow's input and output ports. The controller installed the flow table entries to all the switches on the routing path by sending them ofp_flow_mod messages with the flow's match information and the calculated input and output ports.

Experiments were conducted on six algorithms as follows: CLB (centralized load balancing), DLB (distributed load balancing routing), SLB (static load balancing), NLB (none load balancing with a hash function), OSPF (link-state routing), and RIP (distance-vector routing). CLB and DLB are routing algorithms according to embodiments of the subject invention, and the other four are comparison algorithms. SLB performs flow routing based on pre-defined decisions, which distribute uniform traffic evenly on every link in the network to achieve load balancing. NLB randomly picks one from all available paths between hosts based on a hash function. The OSPF routing was simulated on OpenFlow controller, with the cost of each link as Cost=Reference/Bandwidth=1000000 Kbps/1 Gbps=0.1. The OpenFlow controller calculates the shortest distance path for a flow. If there are multiple shortest distance paths, the controller picks one path randomly. The RIP routing was simulated on OpenFlow controller. To solve looping problems, a spanning tree was manually created by shutting down links in the fat tree network.

To test each routing algorithm's performance, two types of traffic were conducted: non-uniform and uniform. The 16 hosts were named from host 1 to host 16. Also, the 4 pods were named from pod 1 to pod 4. Each pod contained 4 hosts in ascending order. A flow is a sequence of packets transmitted from Iperf client to Iperf server. In non-uniform traffic, there are four groups of flows: in group (1) hosts 1, 5, 9 are clients and all hosts in pod 4 are servers; in group (2) hosts 2, 6, 14 are clients and all hosts in pod 3 are servers;

in group (3) hosts 3, 11, 15 are clients and all hosts in pod 2 are servers; in group (4) hosts 8, 12-16 are clients and all hosts in pod 1 are servers. During each group, the selection of Iperf clients follows a round-robin fashion. The selection of Iperf servers is stochastic. Overall, there are 12 hosts as clients and 16 hosts as servers. For each routing algorithm, nine tests were conducted as the number of flows each client generates ranges from 1 to 9, mapping from load 0.1 to load 0.9. In uniform traffic, each host had the same probability to be selected as Iperf client as well as server. However, one restriction was that one UDP flow's client and server cannot be the same host. Load was measured as the total bandwidth of all flows generated by all clients divided by number of clients. The performance of each algorithm was tested with load from 0.1 to 0.9.

End-to-end packet delay of different routing algorithms was examined. End-to-end packet delay measures the time from when the packet is sent by the source to the time it received by the destination. Short end-to-end delay indicates that the network is not congested, and vice versa.

Figure 3:
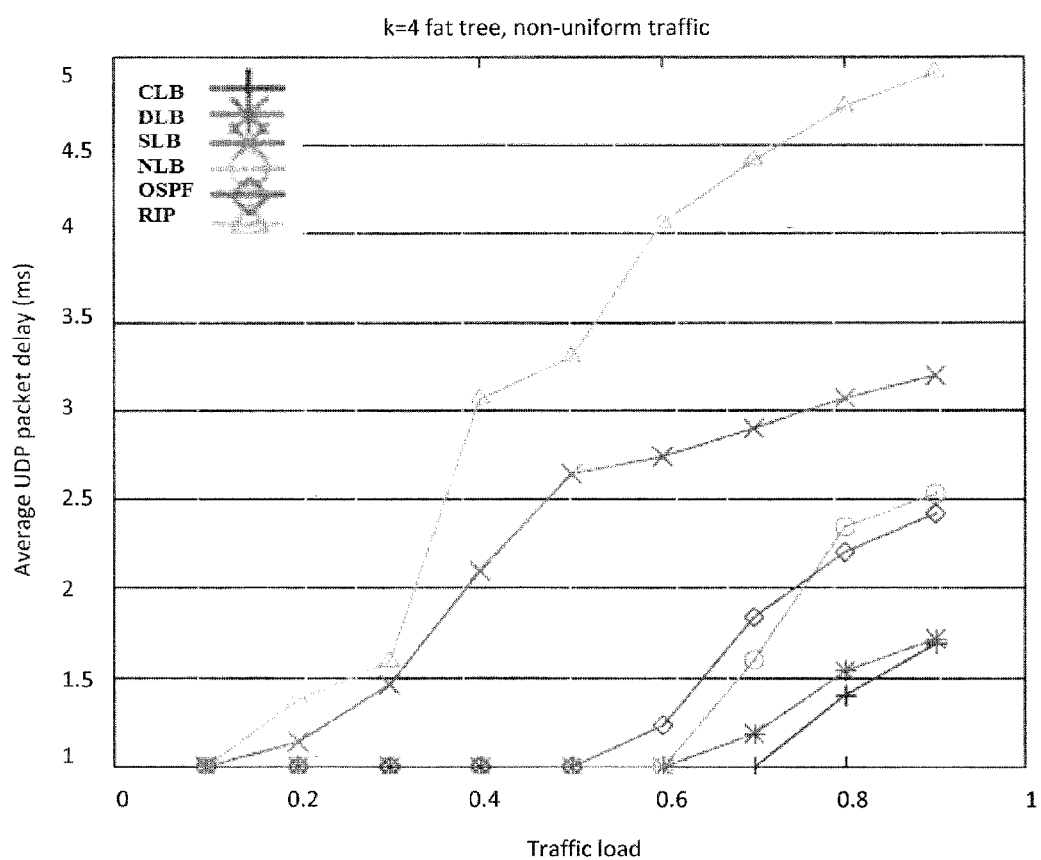
FIG. 3 shows a plot of average packet delay for different routing algorithms for non-uniform traffic.

FIG. 3 shows the average end-to-end delay under non-uniform traffic. In FIG. 3, CLB is the blue line (with plus signs), DLB is the green line (with asterisks), SLB is the red line (with X's), NLB is the teal line (with circles), OSPF is the purple line (with diamonds), and RIP is the tan line (with triangles). Referring to FIG. 3, CLB and DLB significantly outperform the remaining algorithms, showing that they achieve better load balance. In particular, CLB has slightly shorter delay than DLB, which demonstrates the superiority of the centralized control framework. By contrast, RIP has the longest end-to-end delay, because it does not support multipathing, and thus cannot utilize the multi-rooted fat tree topology. SLB has the second longest delay since it has a static load balancing mode and suffers from the non-uniform traffic pattern. Finally, NLB and OSPF have better performance than RIP and SLB but worse than CLB and DLB. NLB and OSPF have limited support for multipath load balancing.

Figure 4:
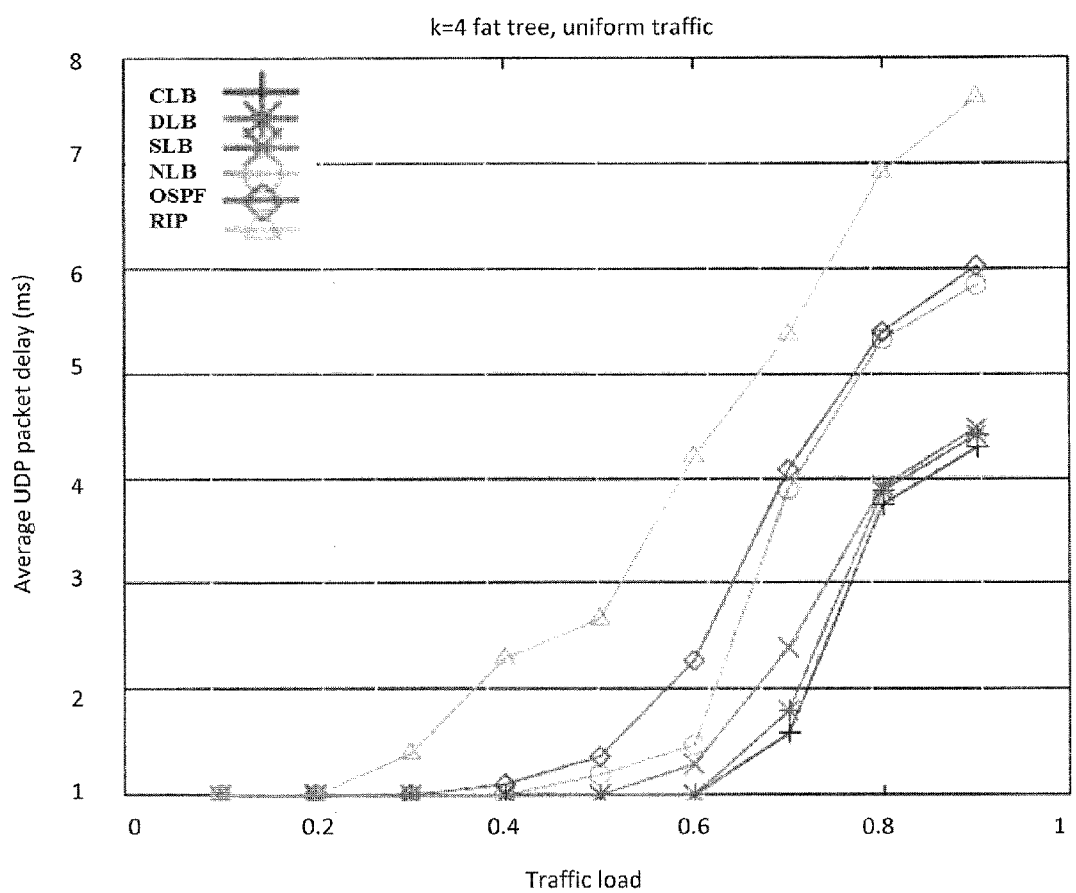
FIG. 4 shows a plot of average packet delay for different routing algorithms for uniform traffic.

FIG. 4 shows the average end-to-end delay under uniform traffic. In FIG. 4, CLB is the blue line (with plus signs), DLB is the green line (with asterisks), SLB is the red line (with X's), NLB is the teal line (with circles), OSPF is the purple line (with diamonds), and RIP is the tan line (with triangles). Referring to FIG. 4, a similar result is observed to that with the non-uniform traffic. CLB and DLB have the shortest delay, RIP has the longest delay, and NLB and OSPF are in the middle. However, the performance of SLB is significantly improved, because its static load balancing mode works better under the uniformly distributed traffic.

Next, the network throughput of different routing algorithms was examined. Network throughput is the ratio of the total amount of traffic sent by all hosts, and more server congestion leads to lower throughput.

Figure 5:
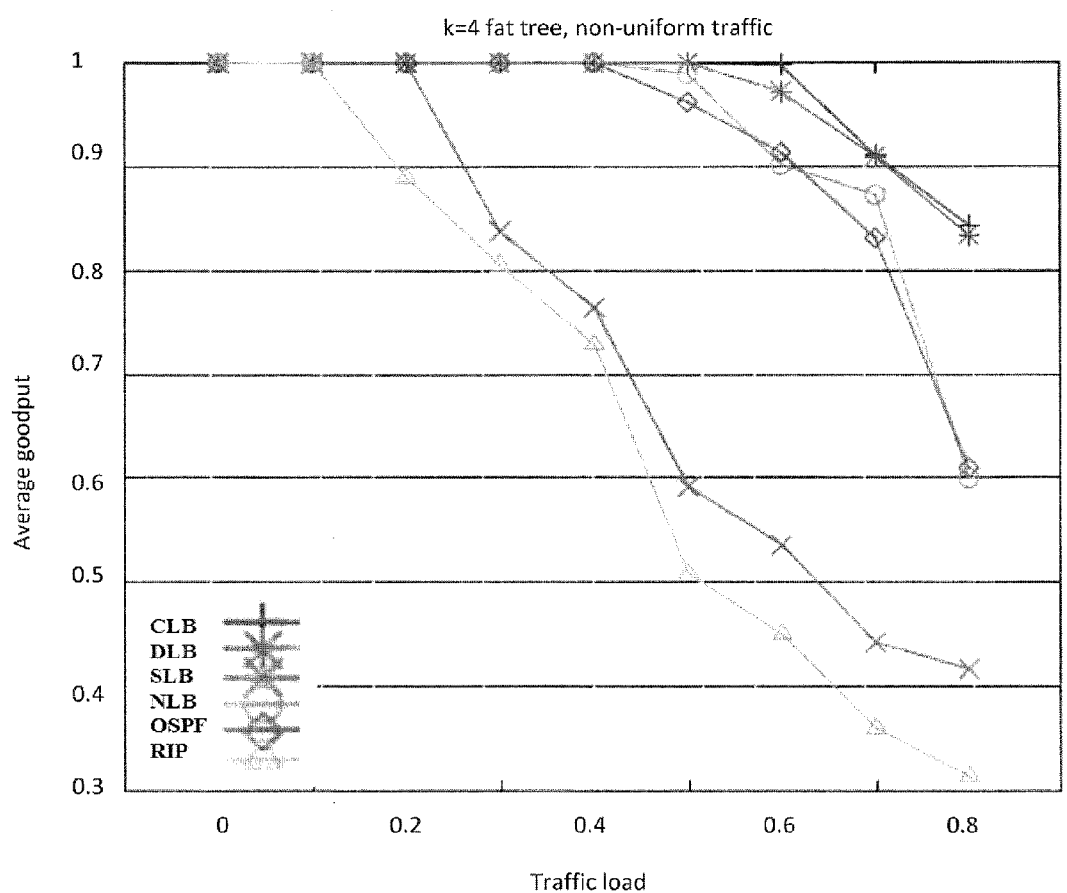
FIG. 5 shows a plot of average network throughput for different routing algorithms for non-uniform traffic.

FIG. 5 shows the average network throughput under the non-uniform traffic. In FIG. 5, CLB is the blue line (with plus signs), DLB is the green line (with asterisks), SLB is the red line (with X's), NLB is the teal line (with circles), OSPF is the purple line (with diamonds), and RIP is the tan line (with triangles). Referring to FIG. 5, CLB and DLB have the highest network throughput (i.e., the least congestion). Even if the traffic load is 0.9, the throughput for CLB and DLB can reach about 85%. Consistently, CLB performs slightly better than DLB, benefiting from the centralized control and more optimized routing. RIP and SLB have the lowest throughput, because the former does not support multipathing and the latter has a static load balancing mode not compatible with the non-uniform traffic pattern. Again, NLB and OSPF have better performance than RIP and SLB, but worse than CLB and DLB.

Figure 6:
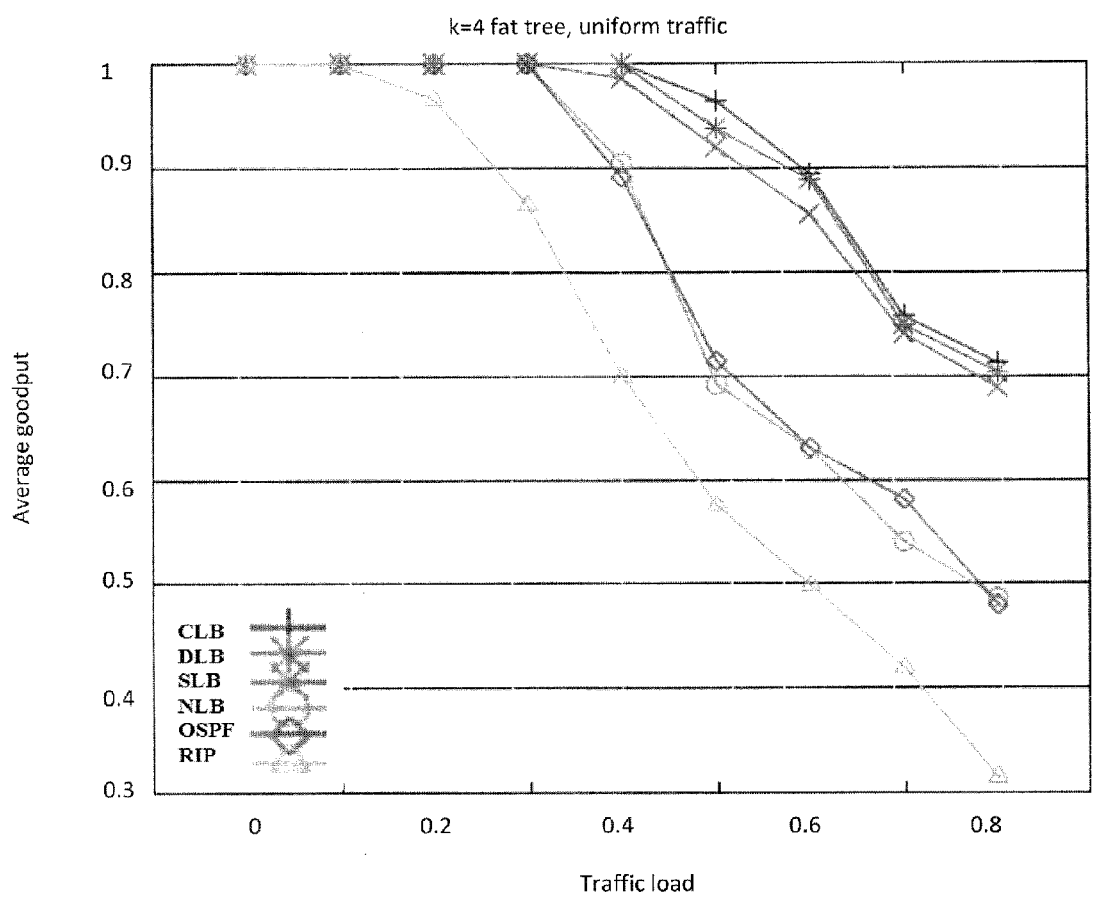
FIG. 6 shows a plot of average network throughput for different routing algorithms for uniform traffic.

FIG. 6 shows the average network throughput under the uniform traffic. In FIG. 6, CLB is the blue line (with plus signs), DLB is the green line (with asterisks), SLB is the red line (with X's), NLB is the teal line (with circles), OSPF is the purple line (with diamonds), and RIP is the tan line (with triangles). Referring to FIG. 6, the results are similar to those under the non-uniform traffic, except that the performance of SLB improves significantly due to the uniformly distributed traffic pattern. However, CLB and DLB still have the highest network throughput.

Algorithms were implemented in a real testbed and in the NS-3 simulator. Both the experiment and simulation results demonstrated that algorithms of the subject invention (e.g., CLB and DLB) significantly outperform existing solutions on network throughput and packet delay.

All patents, patent applications, provisional applications, and publications referred to or cited herein, including those listed in the "References" section, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

REFERENCES

[1] "Who Has the Most Web Servers?" http://www.datacenterknowledge.com/archives/2009/10/13/facebook-now-has-30000-servers/.
[2] M. Al-Fares, A. Loukissas, and A. Vandat, "A scalable, commodity data center network architecture," in ACM SIGCOMM, Seattle, Wash., August 2008.
[3] M. Al-Fares and A. V. Alexander L., "A scalable, commodity data center network architecture," Dept. Of Computer Science and Engineering, University of California, San Diego, Tech. Rep.
[4] M. Al-fares, S. Radhakrishnan, B. Raghavan, N. Huang, and A. Vandat, "Hedera: dynamic flow scheduling for data center networks," in USENIX NSDI, San Josa, Calif., April 2010.
[5] T. Benson, A. Anand, A. Akella, and M. Zhang, "The case for fine-grained traffic engineering in data centers," in USENIX INM/WREN, San Jose, Calif., April 2010.
[6] K. Chen, C. Guo, H. Wu, J. Yuan, Z. Feng, Y. Chen, S. Lu, and W. Wu, "Generic and automatic address configuration for data center networks," in ACM SIGCOMM, New Delhi, India, August 2010.
[7] K. Chen, C. Hu, X. Zhang, K. Zheng, Y. Chen, and A. V. Vasilakos, "Survey on routing in data centers: Insights and future directions," Tech. Rep., July/August 2011.
[8] T. H. Cormen, C. E. Leiserson, R. L. Rivest, and C. Stein, Introduction to Algorithms, 3rd ed. MIT Press, 2009.
[9] "IP Multicast Load Splitting—Equal Cost Multipath (ECMP) Using S, G and Next Hop," http://www.cisco.com/en/US/docs/ios/12 2sr/12 2srb/feature/guide/srbm-path.htmlg.
[10] C. Fraleigh, S. Moon, B. Lyles, C. Cotton, M. Khan, D. Moll, R. Rockell, T. Seely, and S. C. Diot, "Packet-level traffic measurements from the sprint ip backbone," IEEE Network, vol. 17, no. 6, pp. 6-16, November 2003.

[11] A. Greenberg, N. Jain, S. Kandula, C. Kim, P. Lahiri, D. Maltz, P. Patel, and S. Sengupta, "V12: a scalable and flexible data center network," in ACM SIGCOMM, Barcelona, Spain, August 2009.
[12] C. Guo, G. Lu, D. Li, H. Wu, X. Zhang, Y. Shi, C. Tian, Y. Zhang, and S. Lu, "Bcube: a high performance, server-centric network architecture for modular data centers," in ACM SIGCOMM, Barcelona, Spain, August 2009.
[13] C. Guo, H. Wu, K. Tan, L. Shi, Y. Zhang, and S. Lu, "Dcell: a scalable and fault-tolerant network structure for data centers," in ACM SIGCOMM, Seattle, Wash., August 2008.
[14] B. Heller, S. Seetharaman, P. Mahadevan, Y. Yiakoumis, P. Sharma, S. Banerjee, and N. Mckeown, "Elastictree: saving energy in data center networks," in USENIX NSDI, San Josa, Calif., April 2010.
[15] D. Johnson, "Fast algorithms for bin packing," Journal of Computer and System Sciences, vol. 8, no. 3, p. 272314, June 1974.
[16] J. Kurose and K. Ross, Computer networking: a top-down approach (4th Edition), 4th ed. Addison Wesley, 2007.
[17] N. Mckeown, S. Shenker, T. Anderson, L. Peterson, J. Turner, H. Balakrishnan, and J. Rexford, "Openflow: enabling innovation in campus networks," ACM SIGCOMM Computer Communication Review, vol. 38, no. 2, pp. 69-74, April 2006.
[18] D. S. J. Michael R. Garey, Computers and Intractability, A guide to the theory of NP Completeness.
[19] J. Mudigonda and P. Yalagandula, "Spain: Cots datacenter ethernet for multipathing over arbitrary topologies," in USENIX NSDI, San Josa, Calif., April 2010.
[20] R. N. Mysore, A. Pamboris, N. Farrington, N. Huang, P. Miri, S. Radhakrishnan, V. Subramanya, and A. Vandat, "Portland: a scalable fault-tolerant layer2 data center network fabric," in ACM SIGCOMM, Barcelona, Spain, August 2009.
[21] J. Naous, D. Erickson, A. Covington, G. Appenzeller, and N. McKeown, "Implementing an openflow switch on the netfpga platform," in ACM/IEEE ANCS, San Jose, Calif., November 2008.
[22] "Cisco OpenFlow Switches," http://blogs.cisco.com/tag/openflow/.
[23] "GENI OpenFlow Backbone Deployment at Internet2," http://groups.geni.net/geni/wiki/OFI2.
[24] "HP OpenFlow Switches," http://h30507.www3.hp.com/t5/HP-Networking/Take-control-of-the-network-OpenFlow-a-new-tool-for-building-and/ba-p/92201.
[25] "NEC OpenFlow Switches," http://www.necam.com/pflow/.
[26] "OpenFlow 1.0 Release," http://www.openflowswitch.org/wk/index.php/OpenFlow v1.0.
[27] "The OpenFlow Consortium," http://www.openflow-switch.org.
[28] D. Pan and Y. Yang, "Localized independent packet scheduling for buffered crossbar switches," IEEE Transactions on Computers, vol. 58, no. 2, pp. 260-274, February 2009.
[29] "OpenFlow Slicing," http://www.openflowswitch.org/wk/index.php/Slicing.
[30] G. Wang, D. G. Andersen, M. Kaminsky, M. Kozuch, T. S. E. Ng, K. Papagiannaki, and M. Ryan, "c-through: part-time optics in data centers," in ACM SIGCOMM, New Delhi, India, August 2010.

What is claimed is:

1. A method of load balancing in a network, comprising:
receiving, by a switch, a packet;
looking up, by the switch, a packet header of the packet to check whether the packet belongs to an existing flow;
if the packet belongs to an existing flow, forwarding the packet based on information in a flow table of the switch, and otherwise, creating a new entry in the flow table for the packet and calculating the next hop;
determining if the next hop is an upstream or downstream layer of the network based on a destination IP address; and
comparing load values of links to the next layer and selecting a worst-fit link,
wherein the network is represented by a model, such that the network is modeled as a directed graph $G=(H \cup S, L)$, where a node $h \in H$ is a host, where a node $s \in S$ is a switch, and where an edge $(n_i, n_j) \in L$ is a link connecting a switch with another switch or a host,
each edge $(n_i, n_j)$ having a nonnegative capacity $c(n_i, n_j) \geq 0$ indicating the available bandwidth of the corresponding link,
the flows of the network being represented as $F_1, \ldots, F_n$ for n flows,
$F_k$ being defined as a triple $F_k=(a_k, b_k, d_k)$, where $a_k \in H$ is the source host, where $b_k \in H$ is the destination host, and where $d_k$ is the demanded bandwidth,
$f_k(n_i, n_j)$ being used to indicate whether flow $K_k$ is routed via link $(n_i, n_j)$, and
a load-balancing objective function of the model minimizing the maximum load among all the links, by minimizing Equation (1) subject to constraints of Equation (2) and Equation (3):

$$\forall (n_i, n_j) \in L, \sum_k f_k(n_i, n_j) d_k \leq c(n_i, n_j) \text{maxload} \leq c(n_i, n_j) \quad (1)$$

$$\forall k, \forall n_i \in H \cup S \setminus \{a_k, b_k\}, \sum_{n_j \in H \cup S} f_k(n_i, n_j) = \sum_{n_j \in H \cup S} f_k(n_j, n_i) \quad (2)$$

$$\forall k, \sum_{n_i \in H \cup S} f_k(a_k, n_i) = \sum_{n_i \in H \cup S} f_k(n_i, b_k) = 1. \quad (3)$$

2. The method according to claim 1, wherein, if no viable link to the next layer exists, the method further comprises sending, by the switch, the packet back to the previous hop for backtracking.

3. The method according to claim 1, wherein each entry in the flow table of the switch includes at least one piece of information selected from the group consisting of: source address; source port number; destination address; destination port number; and outgoing link on which the flow is assigned.

4. The method according to claim 1, wherein each entry in the flow table of the switch includes all of the following pieces of information: source address; source port number; destination address; destination port number; and outgoing link on which the flow is assigned.

5. The method according to claim 1, wherein the network is a fat tree based data center network.

6. The method according to claim 1, wherein the flow table of the switch determines whether the packet is treated as part of a new flow, treated as part of an existing flow, or backtracked.

7. A system for load balancing a network, wherein the system comprises:
a switch configured to:
receive a packet;
look up a packet header of the packet to check whether the packet belongs to an existing flow;
if the packet belongs to an existing flow, forward the packet based on information in a flow table of the switch, and otherwise, create a new entry in the flow table for the packet and calculate the next hop;
determine if the next hop is an upstream or downstream layer of the network based on a destination IP address; and
compare load values of links to the next layer and selecting a worst-fit link,
wherein the network is represented by a model, such that the network is modeled as a directed graph $G=(H \cup S, L)$, where a node $h \in H$ is a host, where a node $s \in S$ is a switch, and where an edge $(n_i, n_j) \in L$ is a link connecting switch with another switch or a host,
each edge $(n_i, n_j)$ having a nonnegative capacity $c(n_i, n_j) \geq 0$ indicating the available bandwidth of the corresponding link,
the flows of the network being represented as $F_1, \ldots, F_n$ for n flows,
$F_k$ being defined as a triple $F_k=(a_k, b_k, d_k)$, where $a_k \in H$ is the source host, where $b_k \in H$ is the destination host, and where $d_k$ is the demanded bandwidth,
$f_k(n_i, n_j)$ being used to indicate whether flow $K_k$ is routed via link $(n_i, n_j)$, and
a load-balancing objective function of the model minimizing the maximum load among all the links, by minimizing Equation (1) subject to constraints of Equation (2) and Equation (3):

$$\forall (n_i, n_j) \in L, \sum_k f_k(n_i, n_j)d_k \leq c(n_i, n_j)\text{maxload} \leq c(n_i, n_j) \quad (1)$$

$$\forall k, \forall n_i \in H \cup S \setminus \{a_k, b_k\}, \sum_{n_j \in H \cup S} f_k(n_i, n_j) = \sum_{n_j \in H \cup S} f_k(n_j, n_i) \quad (2)$$

$$\forall k, \sum_{n_i \in H \cup S} f_k(a_k, n_i) = \sum_{n_i \in H \cup S} f_k(n_i, b_k) = 1. \quad (3)$$

8. The system according to claim 7, wherein the switch is further configured to send the packet back to the previous hop for backtracking if no viable link to the next layer exists.

9. The system according to claim 7, wherein each entry in the flow table of the switch includes at least one piece of information selected from the group consisting of: source address; source port number; destination address; destination port number; and outgoing link on which the flow is assigned.

10. The system according to claim 7, wherein the flow table of the switch determines whether the packet is treated as part of a new flow, treated as part of an existing flow, or backtracked.

11. The system according to claim 7, further comprising a computer-readable medium having the model representing the network stored thereon.

12. The system according to claim 7, further comprising a processor in operable communication with the switch.

* * * * *